March 6, 1951 H. CHIREIX 2,544,255

ULTRA-SHORT WAVE REPEATER

Filed April 16, 1947

INVENTOR.
HENRI CHIREIX,
BY
John B. Brady
ATTORNEY

Patented Mar. 6, 1951 2,544,255

UNITED STATES PATENT OFFICE 2,544,255

ULTRA-SHORT WAVE REPEATER

Henri Chireix, Paris, France, assignor to Societe Francaise Radio Electrique, a corporation of France Application April 16, 1947, Serial No. 741,725
In France June 11, 1942

Section 1, Public Law 690, August 8, 1946
Patent expires June 11, 1962

1 Claim. (Cl. 250—15)

This invention relates to ultra-short wave communication systems and more particularly though not exclusively, to multiplex systems for point to point communication on decimetre waves, utilizing frequency modulation. Such systems generally entail terminal stations and intermediate relay stations and it is obviously advantageous to make these stations as simple as possible.

In a multiplex transmission system the cross-talk level must be kept as low as possible and the modulation therefore should be as nearly perfectly linear as possible.

Further, in a frequency modulated transmission system, the carrier frequency i. e. the mean transmitted frequency should be as stable as possible, while at the same time, in a multiplex system the maximum frequency deviation should be high; 1 megacycle for example in order to give a good signal to noise ratio. These last two requirements are of course, in opposition to one another.

One known method of producing decimetre waves of good power and stability is by utilizing velocity-modulated tubes for example of the klystron type. Such a tube has two resonant cavities which are traversed by an electron beam, whose density may be controlled by a density control grid. Such tubes, however, do not lend themselves satisfactorily to frequency modulation when the two cavities are coupled magnetically or electrostatically in order to maintain oscillation. Moreover the intensity of the electron beam does not follow the voltage applied to the electron density control grid sufficiently linearly to give accurate modulation in amplitude.

There are, however, known methods whereby relatively longer waves e. g. metre waves may be produced and modulated in frequency so as to obtain good frequency deviation and linearity of modulation.

The invention consists in combining a frequency modulated metre wave with an unmodulated decimetre wave in a frequency changing circuit, so as to derive a wave whose frequency is the sum or the difference of the two mixed frequencies and which, consequently, will be similarly modulated in frequency with the same frequency with the same frequency deviation.

Figure 1:
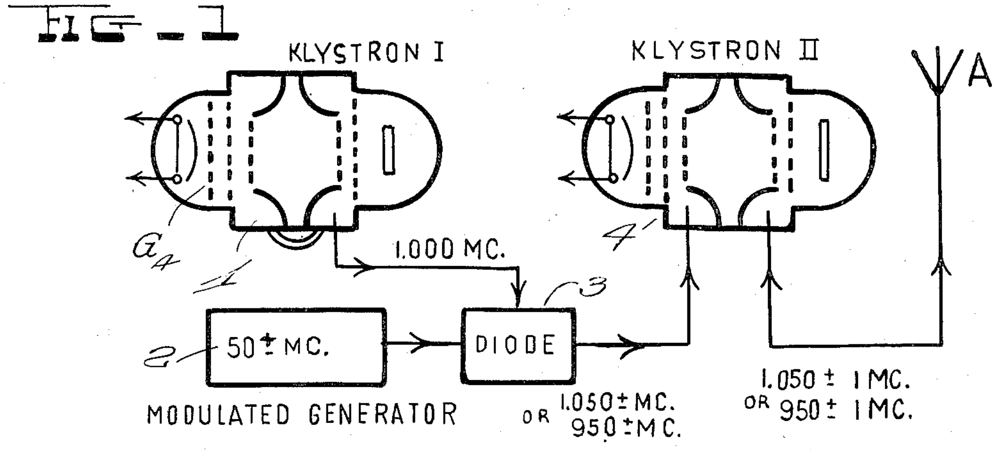
Figure 2:
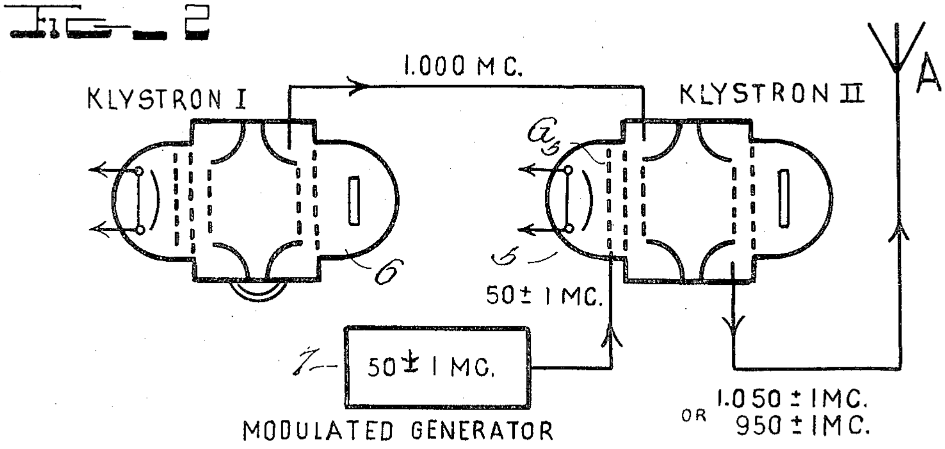
Figure 3:
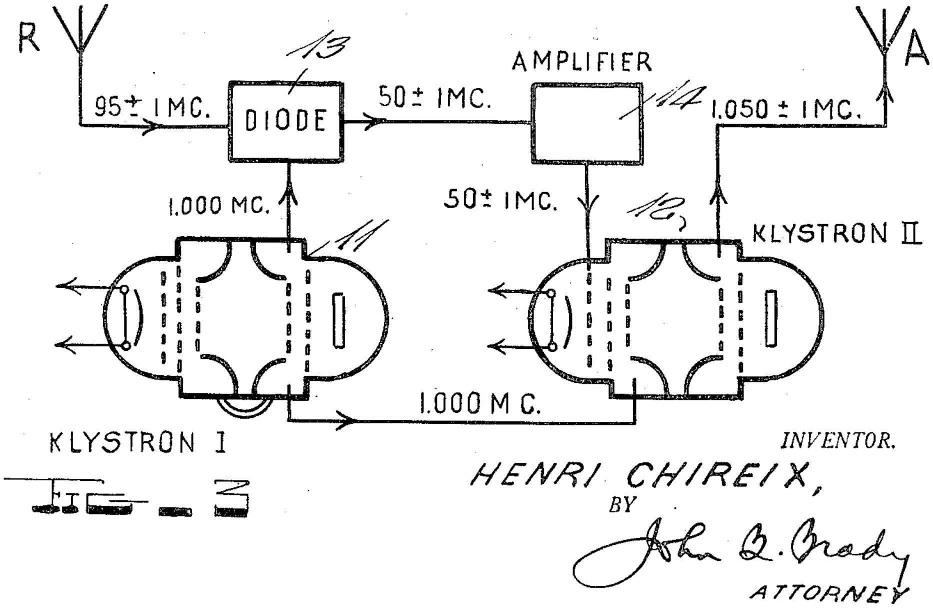

In the drawings, Figs. 1 and 2 show schematically different embodiments of the invention, while Fig. 3 illustrates application of the invention in an intermediate relay station of a communication system.

In order to better understand the invention, a numerical case of its application will be given purely by way of example, the accompanying drawings (Figs. 1 to 3) being referred to in the explanations following.

Suppose there is available at a transmitting station a klystron 1 (Fig. 1) adapted to give a frequency of 1000 megacycles per second (a 30 cm. wave) and a frequency modulated transmitter with a mean or carrier frequency of 50 megacycles (6 metre wave modulated ±1 megacycle).

In one way of carrying out the invention, less to be preferred than another to be described later herein, these two oscillations are combined in a diode mixer 3 at a high amplitude level so that 950±1 megacycles or 1050±1 megacycles may be obtained. The output circuit of the diode is constituted by the input cavity of a second klystron 4, tuned to one of these frequencies. This second klystron is operated as a power amplifier so that increased energy is obtained at the second cavity thereof, which is also tuned to the same mean frequency giving there a final wave which modulated in frequency by ±1 megacycle just as was the initial wave and, consequently, without additional distortion as compared therewith. The transmission is effected through aerial A coupled to this second cavity.

It will be observed that the above embodiment involves the provision of a frequency changing diode adapted to give output energy at a level sufficient suitably to excite the amplifying klystron. Further no use is made of the density control grid G4 of the amplifying klystron.

According to a second and preferred embodiment shown in Fig. 2, these defects are avoided by effecting the change of frequency by utilization of the density control grid of the amplifying klystron. To this end the input cavity of the amplifying klystron 5 is coupled directly to the self-oscillating klystron 6 and is therefore tuned to the frequency of 1000 megacycles. If the two klystrons are of the same type, the power required for excitation will be very easily obtained.

The wave modulated in frequency by 50±1 megacycles which issues from generator 7, is applied to the density control grid of the amplifying klystron whose output cavity is then tuned to 950 or 1050 megacycles and a wave of constant amplitude, which will be modulated in frequency only, will be obtained at this second cavity.

It will be seen that this arrangement has certain points of similarity with circuits employed on longer waves in single side band transmitters. It differs from these however in that, the amplitude of the control voltage on the density control grid of the klystron is constant and only the instantaneous frequency thereof varies. The amplitude modulation of the beam is thus kept constant. It will likewise be seen that even if this amplitude does not follow a linear law in relation to the control voltage, the result will only be to create side bands at 900 and 1100 megacycles, 850 and 1150 megacycles and so on owing to the selective properties of the klystron output cavity, these frequencies will be filtered out and as a result have no effect, the frequency modulation thus remaining linear.

Another advantage of the second embodiment is that the power of the frequency modulated metre wave transmitter may be quite small since this transmitter has only to drive the density control grid of the amplifying klystron.

The application of the invention to an intermediate relay station in a communication system will now be described by referring to Fig. 3. The function of such a station is of course to retransmit, on a slightly different frequency, the energy received, after suitable amplification. Suppose for example, it is required to re-transmit on 1050±1 megacycles energy received at a weak level on 950±1 megacycles. For this purpose, a set of two associated klystrons 11 and 12 generally arranged as already described are provided at the relay station. By means of a small quantity of energy taken from self-oscillating klystron 11 at 1000 megacycles, the low level waves which are collected by an aerial R are demodulated in a diode 13, in accordance with normal practice and a metre wave modulated in frequency 50±1 megacycles is again obtained. This wave is amplified on amplifier 14 to the level required in order to control the density control grid $G_{12}$ of an amplifying klystron 12 which receives on its first cavity (counting from the cathode) the energy at 1000 megacycles from the self-oscillating klystron 11. The output cavity of the amplifying klystron is tuned to 1050 megacycles and coupled to the re-transmitting radiator A. Thus the relay station has merely to amplify a metre wave modulated solely in frequency. Although such amplification may be effected without any serious distortion, such distortion as may be present may be substantially eliminated by linearization provided by the use of negative feedback which is well known to those skilled in the art. It will be obvious that despite the selective qualities of cavities, selective qualities which are, however, reduced above all where the output cavity coupled to the radiator is concerned, a very small quantity of energy within the spectrum at 950±1 megacycles may be selected from the latter. Although very small, this energy will still be large as compared with that received and will be precisely on the same frequency as the incoming energy. It may thus be used for negative feedback. Of course, the metre wave amplifier may also be furnished with negative feed-back.

While I have described my invention in certain preferred embodiments, I realize that modifications and changes may be made, and I desire that it be understood that no limitations upon my invention are intended other than may be imposed by the scope of the appended claims.

What I claim is:

In a system of radio communication between remote stations by frequency-modulated decimetric waves with an intermediate relay station, means at the relay station for receiving, at a low amplitude level, the emitted frequency-modulated decimetric waves, means for transforming these waves into frequency-modulated metric waves having the same frequency deviation as the decimetric waves, an electronic tube with velocity modulation of the klystron type equipped with an admission resonator buncher, a discharge resonator catcher, and a control grid controlling the density of the electron beam, means for applying the modulated metric waves to the said control grid, means for generating non-modulated decimetric waves, means for applying these latter waves to the admission resonator bunches of the said tube, the discharge resonator catcher being tuned to the frequency of the modulated decimetric waves to be reemitted, wherein the said means for transforming the decimetric waves into metric waves comprise the detection of the frequency-modulated decimetric waves received by the relay station, by the use of waves transferred from the said means for generating non-modulated decimetric waves, and means coupled to the discharge resonator buncher for the reemission of these modulated decimetric waves at an elevated level of amplitude.

HENRI CHIREIX.

REFERENCES CITED

The following references are of record in the file of this patent:

UNITED STATES PATENTS

| Number | Name | Date |
|---|---|---|
| Re. 22,506 | Hahn | June 27, 1944 |
| 2,257,282 | Smith et al. | Sept. 30, 1941 |
| 2,287,533 | Peterson | June 23, 1942 |
| 2,303,444 | Evans | Dec. 1, 1942 |
| 2,369,268 | Trevor | Feb. 13, 1945 |
| 2,375,223 | Hansen et al. | May 8, 1945 |
| 2,401,945 | Linder | June 11, 1946 |
| 2,406,371 | Hansen et al. | Aug. 27, 1946 |
| 2,415,094 | Hansen et al. | Feb. 4, 1947 |
| 2,421,394 | Schelleng | June 3, 1947 |
| 2,425,738 | Hansen | Aug. 19, 1947 |